US011950034B2

(12) United States Patent
Beaubrun

(10) Patent No.: US 11,950,034 B2
(45) Date of Patent: Apr. 2, 2024

(54) LOUDSPEAKER ENCLOSURE

(71) Applicant: Manley Beaubrun, Phillipsburg, NJ (US)

(72) Inventor: Manley Beaubrun, Phillipsburg, NJ (US)

( * ) Notice: Subject to any disclaimer, the term of this patent is extended or adjusted under 35 U.S.C. 154(b) by 24 days.

(21) Appl. No.: 17/702,036

(22) Filed: Mar. 23, 2022

(65) Prior Publication Data

US 2023/0308790 A1 Sep. 28, 2023

(51) Int. Cl.

| | |
|---|---|
| ***H04R 1/02*** | (2006.01) |
| ***H04R 1/26*** | (2006.01) |
| ***H04R 1/32*** | (2006.01) |
| ***H04R 9/06*** | (2006.01) |

(52) U.S. Cl.

CPC ................. *H04R 1/02* (2013.01); *H04R 1/26* (2013.01); *H04R 1/323* (2013.01); *H04R 9/063* (2013.01)

(58) Field of Classification Search

CPC . H04R 1/02; H04R 1/26; H04R 1/323; H04R 9/063; H04R 1/025; H04R 1/20; H04R 1/22; H04R 1/2807

See application file for complete search history.

(56) References Cited

U.S. PATENT DOCUMENTS

| | | | | |
|---|---|---|---|---|
| D387,764 | S | 12/1997 | Ross, Sr. | |
| 6,062,338 | A | 5/2000 | Thompson | |
| 7,090,047 | B1 | 8/2006 | Lee et al. | |
| 9,131,301 | B2 | 9/2015 | Tsai et al. | |
| 9,479,861 | B2 * | 10/2016 | Bisset | H04R 1/2865 |
| 11,166,090 | B2 | 11/2021 | Alexander | |
| 2002/0106097 | A1 * | 8/2002 | Danley | H04R 1/26 381/345 |
| 2004/0028240 | A1 * | 2/2004 | Spinale | H04R 1/323 381/87 |
| 2015/0139464 | A1 * | 5/2015 | Guo | H04R 1/04 381/334 |
| 2018/0262836 | A1 | 9/2018 | Janes | |
| 2020/0014993 | A1 * | 1/2020 | Alexander | H04R 1/26 |
| 2020/0389714 | A1 | 12/2020 | Roche et al. | |

FOREIGN PATENT DOCUMENTS

| | | |
|---|---|---|
| EP | 2583472 | 8/2014 |
| WO | WO2015142097 | 9/2015 |

* cited by examiner

*Primary Examiner* — Norman Yu

(57) ABSTRACT

A loudspeaker enclosure design is disclosed. The speaker enclosure consists of two sections. An upper section contains a mid-range speaker oriented along a first axis. A lower section contains a subwoofer speaker and two tweeter speakers. The subwoofer, when oriented along a second axis to face upwardly within the enclosure, produces a clean, crisp, and sonorous big bass sound. The mid-range speaker, oriented along the first axis to face downwardly toward the subwoofer speaker, simulates subwoofer sound waves. The tweeters, located at a vertex of an angle defined by the first and second axes, produce a high frequency, treble sound.

14 Claims, 4 Drawing Sheets

LOUDSPEAKER ENCLOSURE

FIELD

The present subject matter, in general, relates to a loudspeaker design, and more particularly relates to a novel design for an enclosure housing four speakers.

BACKGROUND

Sound, a form of energy produced from vibrating objects, propagates as an acoustic wave through air. For many, an audible sound ranges from about 20 Hertz ("Hz") to about 20 kHz, with a frequency above 20 kHz being known as ultrasound.

While there are several "types of sound"—depending upon pitch, loudness, amplitude, and frequency of a sound wave—the several "types" of sound do not please a "sense of hearing" for every listener. In particular, sound heard by a person can be classified into "noise" and "music." Briefly, sound that is unpleasant and/or annoying to one person is "noise," while sound that is pleasant and/or melodious to another person is "music." Moreover, music, characterized as whatever pleases one's sense of hearing, depends on many factors, and varies from person to person.

In my search for prior art relevant to the present subject matter, I found several US patents, US published patent applications, and even a US design patent.

For instance, two versions of a rather simple loudspeaker design are shown in U.S. Design 387,764 to Ross, Sr.; and, while the background of U.S. Pat. No. 6,062,338 to Thompson summarizes several prior art patents in this field, the '338 patent itself discloses a speaker enclosure that is rather structurally complex. Further in this regard, U.S. Pat. No. 11,166,090 to Alexander discloses a vast assortment of loudspeaker designs. Yet with each different design, common features are shown. Also, U.S. Pat. No. 7,090,047 to Lee et al. discloses a "Surround Sound Positioning Tower" system. And U.S. Pat. No. 9,131,301 to Tsai et al. discloses a speaker enclosure that is tall and methods for making it. WO 2015/142097 to Kim discloses so-called lattice-type speakers and speaker systems. EP 2,583,472 to Freeman et al. discloses certain aspects of an acoustic output of an audio device, in response and in relation to, its orientation. US 2020/0389714 to Roche et al. discloses a dual-mode audio system. US 2018/0262836 to Janes discloses a multi-driver array audio speaker system, which includes multiple, closely-spaced drivers in a column-matrix format.

After analyzing these references, I have concluded that no single prior art reference discloses the loudspeaker enclosure of the present subject matter, and that no combination of these references renders the speaker enclosure obvious.

Conventional loudspeakers typically employ one or more sound transducers ("speaker drivers"), adapted to transduce an electrical signal into an audio signal. The transducers in loudspeakers, in turn, may include one or more woofers, designed to reproduce an assortment of low frequencies, as well as one or more sub-woofers, designed to reproduce very low frequencies, including one or more mid-range drivers, designed to reproduce an assortment of mid-range frequencies, one or more tweeters designed to produce various high-range frequencies, and/or one or more super-tweeters designed to produce very high frequencies. The choice and placement of drivers in loudspeaker enclosures affects various sound aspects arriving at a listener location, as does the choice of associated audio equipment. For instance, one speaker driver will have physical characteristics, including fundamental frequencies, moving mass potential, sound dispersion characteristics, and such, different from the physical characteristics of yet another speaker driver. Speaker drivers also have varying levels of directivity. Speaker directivity is a result of the constructive and destructive interference between sound waves originating from various possible locations of a single speaker driver, or sometimes between sound waves originating from different types of speaker drivers. Thus, the "on-axis" and "off-axis" responses of a particular speaker driver could be quite different, especially at higher frequencies. In this field, therefore, most loudspeaker designers are aware that they must account for "directivity" effects when designing their loudspeakers. Otherwise, listener experience could be negatively impacted.

SUMMARY

My novel speaker enclosure, the present subject matter, is made in a way that utilizes constructive interference patterns to produce predetermined sound.

One embodiment of a speaker enclosure in accordance with the present subject matter includes at least four speakers: namely, two tweeter speakers, one mid-range speaker, and one subwoofer. The mid-range speaker and the subwoofer speaker are positioned within the speaker enclosure to form an acute angle, with the single mid-range speaker and the subwoofer speaker both receiving the same signal to produce compressions and rarefactions at the same time, to cause the sound wavelengths generated to overlap in a way resulting in greater amplitude than otherwise produced from individual speakers operating, e.g., independently.

The enclosure consists of two sections. A top section containing a mid-range speaker and, optionally, a Bluetooth media player, where "Bluetooth media player" shall be understood throughout this patent specification as meaning hardware that plays digital media, including digital audio media, in a short-range ("Bluetooth") wireless format used to exchange data between fixed and/or mobile devices over short distances using UHF radio waves in the ISM band, from 2.402 to 2.48 Giga Hertz ("GHz"). A subwoofer speaker, yet another speaker, is positioned at a bottom section of the enclosure to produce a bass range. These two speakers are aligned to play sound waves that are "in phase" at all times, even while located in separate sections of the enclosure. I have found separate location results in a more efficient construction for a special design for an enclosure for a subwoofer. The subwoofer, when oriented to face upward within the enclosure, produces a clean and sonorous ("big") bass sound. The mid-range speaker, oriented at a vertically positioned angle to face down over the subwoofer, simulates its sound waves. The tweeters, located at an endpoint of a predetermined angle, produce a treble and a high frequency.

BRIEF DESCRIPTION OF THE FIGURES

Throughout the drawing figures and detailed description, which includes the conceptual and theoretical operability illustrated by FIGS. 1-4, I shall use similar reference numerals to refer to similar components of the present subject matter.

DETAILED DESCRIPTION in the field of theoretical physics, interference is a phenomenon in which two waves or wave patterns overlap or superpose to form a resultant wave pattern of greater, lower, or the same amplitude. Constructive and destructive interference patterns result from an interaction of wave patterns, correlated or coherent with each other, either because they are generated by the same source or because they have the same, or nearly the same, frequency. Interference patterns can be observed in naturally-occurring waves including but not limited to water surface ripples or "waves," light or so-called "electromagnetic waves," radio frequency "patterns or waves," various acoustic "waves," and "gravity waves," disturbances in the curvature of spacetime, generated by accelerated masses, that propagate as waves outwardly from their source at the speed of light. They were proposed by Henri Poincard (1905) and later "predicted" (1916) by Albert Einstein, on the basis of his general theory of relativity. Gravity waves transport energy as gravitational radiation, which is a form of radiant energy, similar to electromagnetic radiation.

This patent specification shall not delve into harmonics, the science of musical sounds, except to note that music is based on overlapping sound waves characterized as a variety of differing frequencies, some frequencies being partially or entirely additive relative to a given range of frequencies, while other frequencies are partially or perhaps entirely subtractive relative to a different frequency range.

Rather, this patent specification shall begin its discussion of "additive" and "subtractive" wave principles by referring initially to simple sinusoidal wave forms. The superposition-of-waves principle states that when two or more propagating waves of the same type are incident at a point, a resultant amplitude at that point is equal to a vector sum of the amplitudes of the individual waves. Consider, for example, what occurs when a crest 20 of a first wave 30 meets a crest 40 of a second wave 50 of the same frequency F at the same point P1, where a first base line (BL1) and a second base line (BL2), although depicted as separate (in FIG. 1), are actually co-linear, as shown by a third base line (BL3). A resultant amplitude RA, the sum of individual amplitudes (A1+A2), is known as constructive interference.

Figure 1:
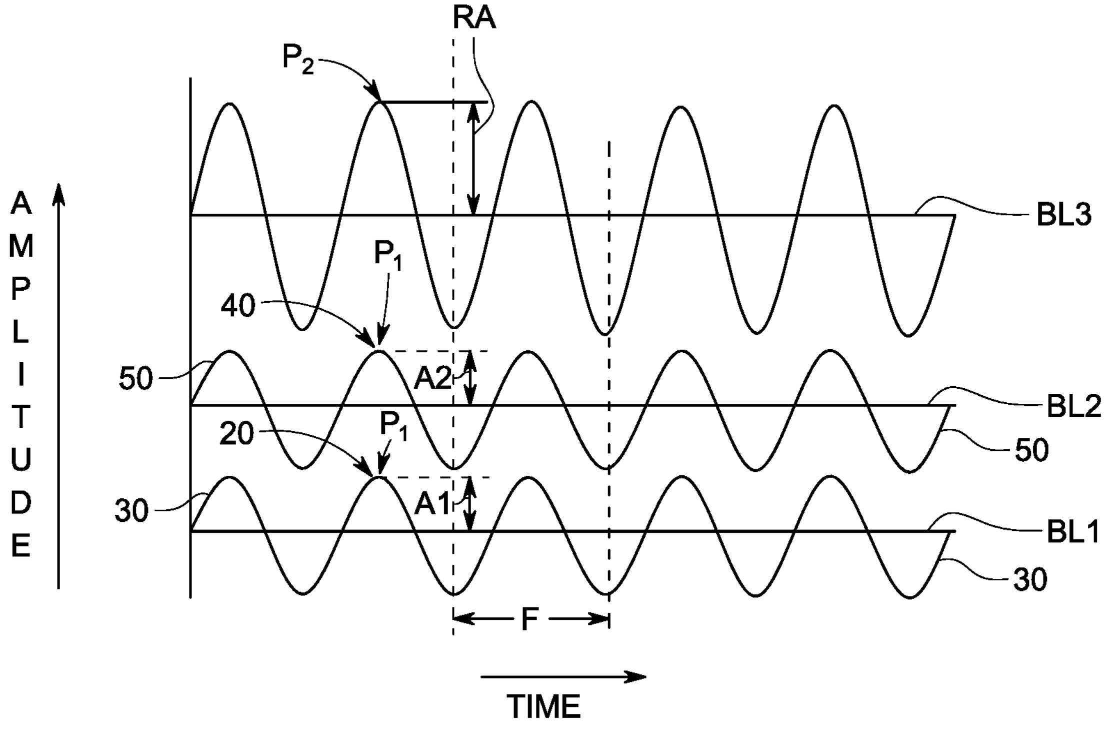
FIG. 1 demonstrates constructive interference patterns for sinusoidal waves, to better understand acoustics associated with the present subject matter.
Figure 2:
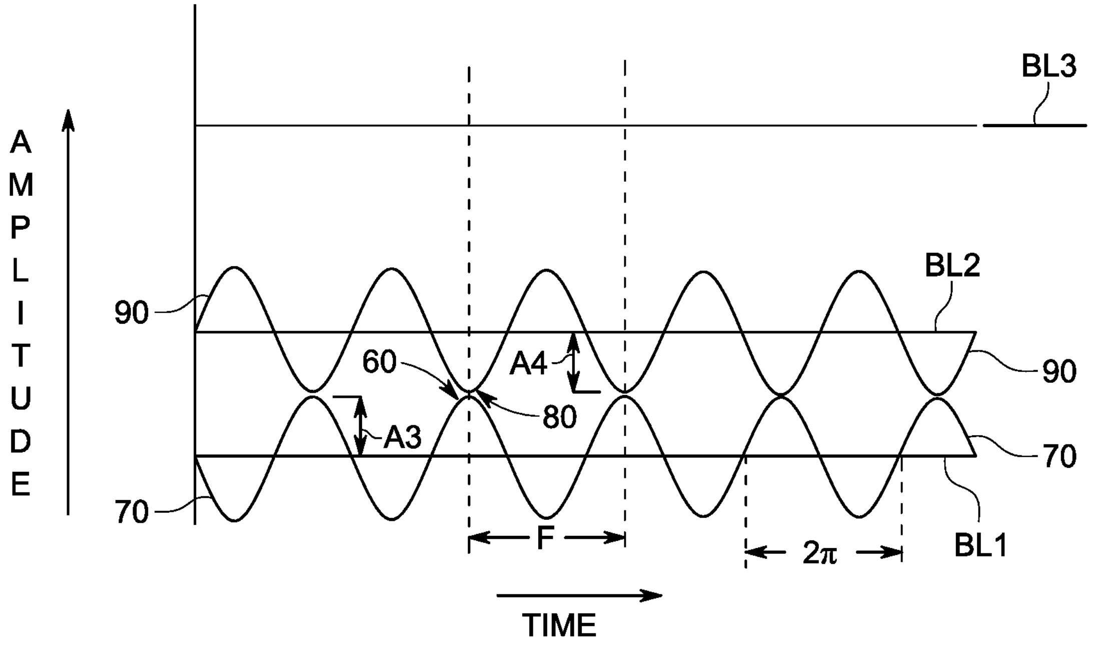
FIG. 2 demonstrates destructive interference patterns for sinusoidal waves, to better understand acoustics associated with the present subject matter.

However, if a crest 60 of one wave 70 meets a trough 80 of another wave 90, then a resultant amplitude is equal to a difference in the individual amplitudes (A3–A4), known as "rarefaction" or "destructive interference." For this illustrative example, first and second co-linear base line values result in the third base line BL3 value presented in FIG. 2. And, as one of ordinary skill in this field is aware, a "constructive interference" occurs when a phase difference between waves is an even multiple of n radians (180°), whereas a destructive interference occurs when a difference is an odd multiple of $\pi$ radians. If a difference between the phases falls between a constructive and a destructive interference, a magnitude of a summed wave amplitude is between a minimum and a maximum value. In FIGS. 1 and 2, the amplitude is presented along the vertical axis and time along the horizontal axis.

While one embodiment of the speaker enclosure of the present subject matter is constructed for the purpose of generating constructive interference patterns to produce sound, another embodiment of the speaker enclosure of the present subject matter could be constructed to generate a mixture of constructive and destructive interference patterns, if desired. The enclosure houses at least four speakers, which include, at least two tweeters, at least one mid-range speaker, and at least one subwoofer. The at least one mid-range speaker and the at least one subwoofer are positioned to form an acute angle. In one embodiment, the acute angle could range between 5 degrees and 85 degrees. In another embodiment, the acute angle ranges between about 15 degrees and about 75 degrees. In yet another embodiment, the acute angle could range between about 25 degrees and about 65 degrees. In still another embodiment, the acute angle could range between about 35 degrees and about 55 degrees. In yet another embodiment, the acute angle is about 45 degrees. In embodiments, the at least one mid-range speaker and the at least one subwoofer speaker both receive the same signal, at the same time, to produce constructive interference patterns, for causing their sound wave patterns to overlap, resulting in a greater amplitude than their individual speakers would produce alone. Throughout this patent specification, the term "rarefaction" shall be understood to mean the opposite of compression, in relation to sound waves generated by the loudspeakers mentioned. The enclosure consists of two sections.

Figure 3:
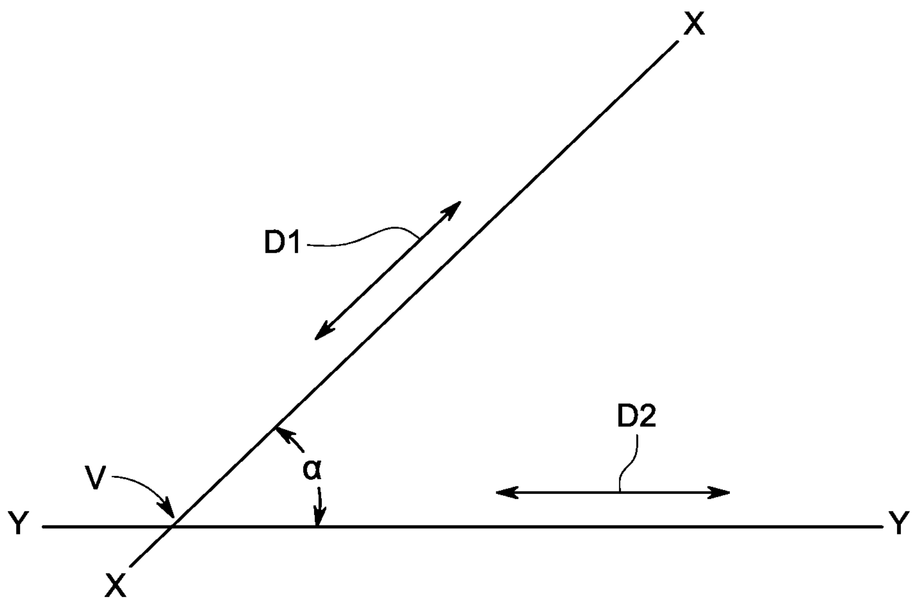
FIG. 3 is a visual of a fundamental principle of the present subject matter.

To better understand how the above-mentioned conventional speakers are positioned within my loudspeaker enclosure, please refer to FIG. 3, which is a conceptual visualization, based on physics (FIGS. 1, 2) for loudspeaker enclosures of the present subject matter, in which a first longitudinal axis X-X oriented in a first direction D1 and a second longitudinal axis Y-Y oriented in a second direction D2, intersect at a vertex V, to define, at vertex V, an acute angle $\alpha$ between these axes.

Figure 4:
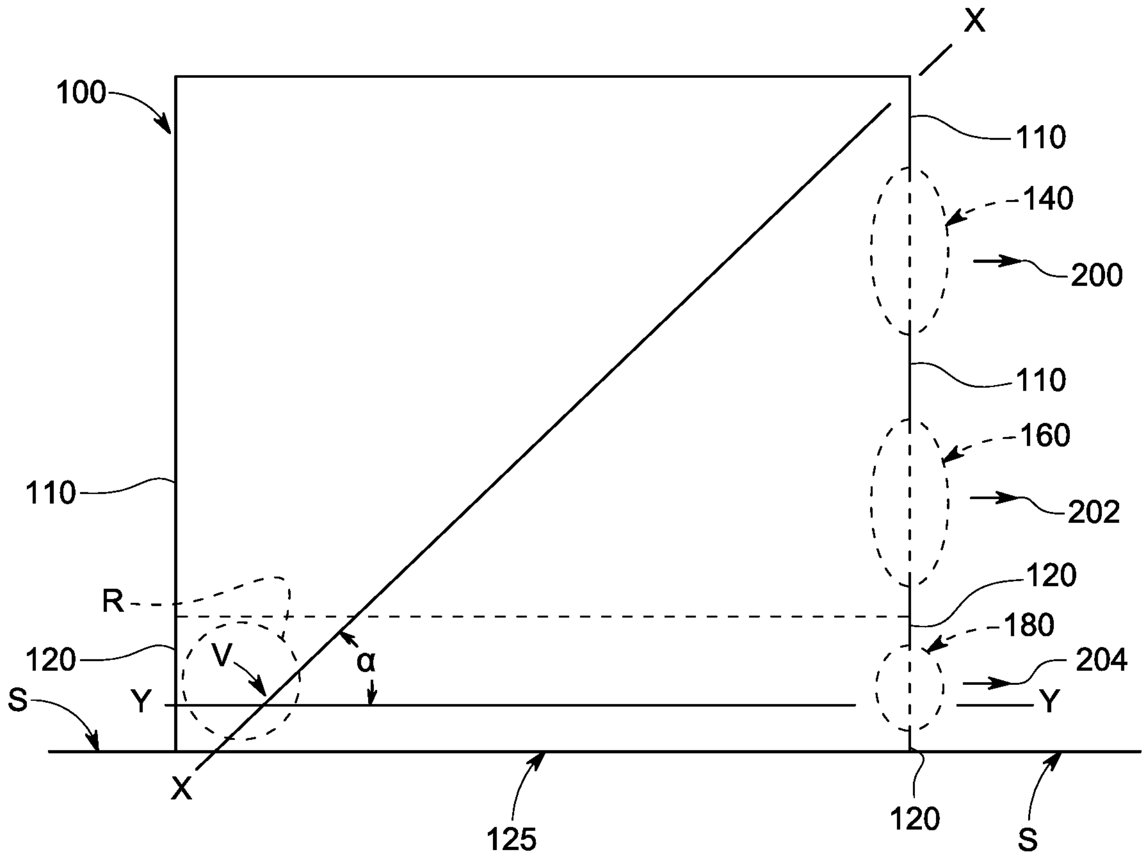
FIG. 4, a side elevational view, is a conceptual embodiment of a speaker enclosure of the present subject matter, incorporating a principle shown in FIG. 3.

Please next refer to FIG. 4, which is yet another conceptual visualization, based upon physics (FIGS. 1, 2) for loudspeaker enclosure designs of the present subject matter, presenting a side elevational view of an example of a conceptual embodiment of a loudspeaker enclosure 100 of the present subject matter. The loudspeaker enclosure 100, not drawn to scale, consists of two sections, namely an upper section 110 and a lower section 120. Lower section 120 includes a base 125 to support speaker enclosure 100 on a solid surface S such as a stage or the ground.

The upper section 110 is configured to contain at least one mid-range speaker (not shown) disposed along the first axis X-X. The lower section 120 is configured to contain at least one subwoofer speaker (not shown), disposed along the second axis Y-Y, and at least two tweeter speakers (neither of which is shown) located within or at a region R where the first and second axes X-X, Y-Y intersect.

The two tweeter speakers each receive a signal to produce treble sound waves and high-frequency sound waves. The mid-range speaker and the subwoofer speaker each receive a signal resulting in the subwoofer speaker and the mid-range speaker generating sound waves simultaneously. In one embodiment of speaker enclosures of the present invention, sound waves characterized as compressions are produced. In another embodiment of the present subject matter, sound waves characterized as a mixture of compressions and rarefactions are produced. The first axis X-X and the second axis Y-Y form an acute angle α relative to the region R.

Throughout this patent specification, loudspeakers mentioned above shall be understood as follows. A "mid-range speaker," known as a "squawker," shall be understood as being a loudspeaker that produces sound at frequencies ranging from about 250 Hertz ("Hz") to about 2000 Hz. A "subwoofer speaker" shall be understood as being a loudspeaker that produces low-pitched audio at frequencies ranging from about 20 Hz ("Hz") to about 200 Hz. A "tweeter speaker," also known as a "treble speaker," shall be understood as a special type of loudspeaker that is designed to produce high audio frequencies, typically up to 100 kHz. The name is derived from the high-pitched sounds made by certain birds, especially in contrast to low woofs made by many dogs, after which low-frequency speakers are named.

The top or upper portion 110 of the loudspeaker enclosure 100 contains the mid-range speaker (not shown) and, optionally, a conventional "Bluetooth" media player (not shown). The subwoofer speaker (not shown) is positioned within the lower section 120 of the loudspeaker enclosure 100 to produce a bass range. The mid-range speaker and the subwoofer speaker are together aligned to play sound waves in phase all the time even though they are housed in separate sections 110, 120 of loudspeaker enclosure 100. Based on such separated-section construction, I discovered I could build a substantially more efficient speaker enclosure design for a subwoofer speaker. The subwoofer faces upward inside the enclosure, which provides a clean and "big bass" sound, while the mid-range speaker faces down at a vertically positioned angle over the subwoofer to simulate sound waves produced by the subwoofer speaker. The two tweeter speakers are positioned close to vertex V of the first and second axes X-X and Y-Y to produce high frequency and treble.

All the speakers mentioned above, contained in the loudspeaker enclosure 100, including the optional Bluetooth media player, "combine" their sound waves, frequencies, tonal qualities and all such sound qualities that are being projected outwardly from the enclosure 100 through an assortment of apertures or openings, shown generally at regions identified by reference numerals 140, 160, and 180, the dimensions and locations of which, of course, shall depend upon a wide variety of factors including the value of the angle α between the first axis X-X and the second axis Y-Y, and other factors known to those of ordinary skill in the field of speaker design, including total number of speakers contained within speaker enclosure 100.

When such apertures, which are illustrated by apertures 140, 160, and 180 in FIG. 4, are generally circular or elliptical in configuration, sound waves having a three-dimensional cone-like shape will be directed outwardly from enclosure 100 in the general direction of arrows identified with reference numerals 200, 202, 204.

I have found sound waves directed outwardly from the speaker enclosure of the present subject matter to be more focused (also referred to "more direct"), and also "in phase," which results in the loudspeaker system of the present subject matter, comprising the loudspeaker enclosure and the speakers enclosed by it, to produce a "sound quality" and "tonality" that is clean and crisp, where the terms "clean" and "crisp" shall be understood to mean a sound having essentially no distortion. Depending upon the power input, the speaker system can be quite loud.

As used throughout this patent specification, the definition of "crisp sound" shall be understood to mean a clear sound with substantially no sound distortion or noise. Throughout this patent specification, the definition of "sound distortion" shall be understood to mean a form of audio signal resulting in a fuzzy, growling, and/or a gritty tone. Throughout this patent specification, the definition of "noise" shall be understood to mean a sizzling, snapping, popping, and/or a hissing sound.

Figure 5:
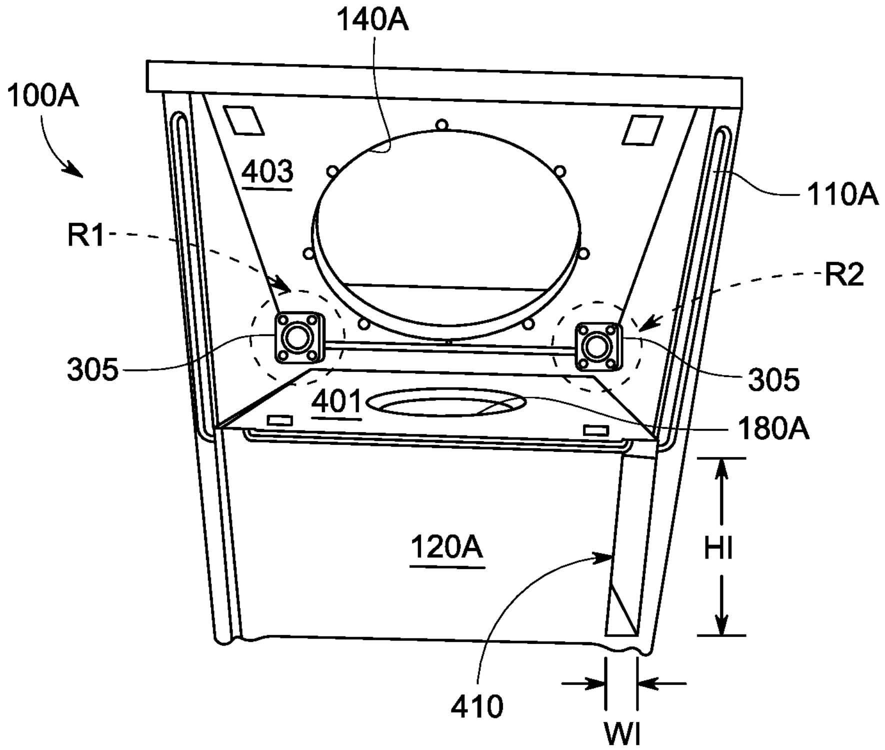
FIG. 5 is a hand drawn sketch, of a frontal view of an embodiment of the speaker enclosure of the present subject matter, in perspective and looking down.
Figure 6:
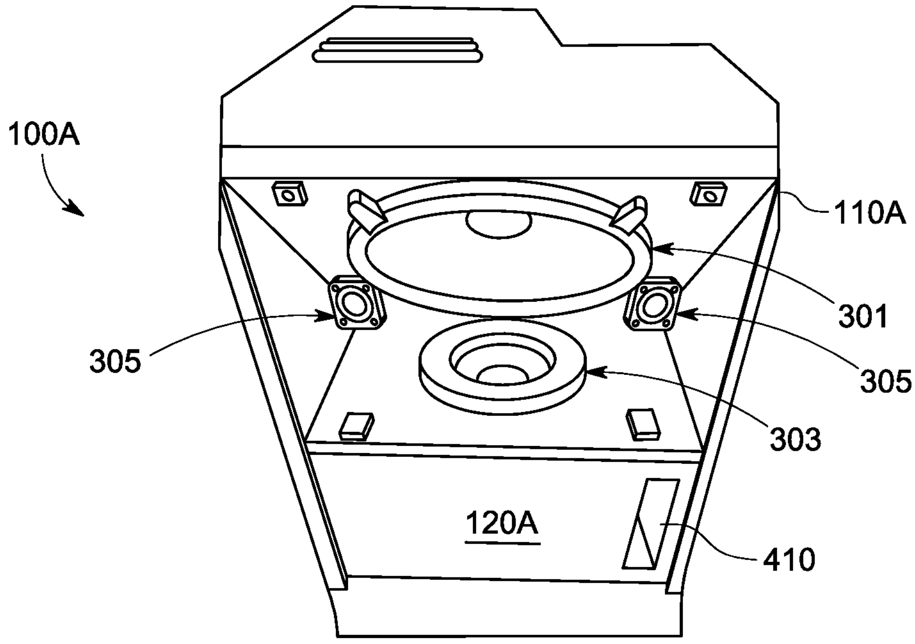
FIG. 6 is a photograph, based on FIG. 5, with the speakers in the enclosure.

Please refer to FIGS. 5 and 6 for a detailed description of an embodiment of a prototype design for the loudspeaker enclosure of the present subject matter. The speaker enclosure 100A has an upper section 110A and a lower section 120A. The upper section 110A includes an aperture 140A dimensioned and configured to receive a mid-range speaker 301 and lower section 120A includes an aperture 180A dimensioned and configured to receive a sub-woofer speaker 303. A spaced-apart pair of tweeter speakers 305 are located in the separated regions R1, R2 where an upper surface 401 of the lower section 120A and an angled surface 403 within upper section 110A approach each other along a line of intersection (not shown). Further in accordance with the present subject matter, the lower section 120A includes an inlet 410 ("air inlet") dimensioned and configured to introduce air into the loudspeaker enclosure. For instance, for loudspeaker enclosure 100A shown in FIG. 5, the air inlet 410 has a height (HI) that is approximately the height of the lower section 120A; and inlet 410 has a width (WI) that is about 1.5 inches. Additional structural details regarding the air inlet 410 are discussed in connection with FIG. 7.

Figure 7:
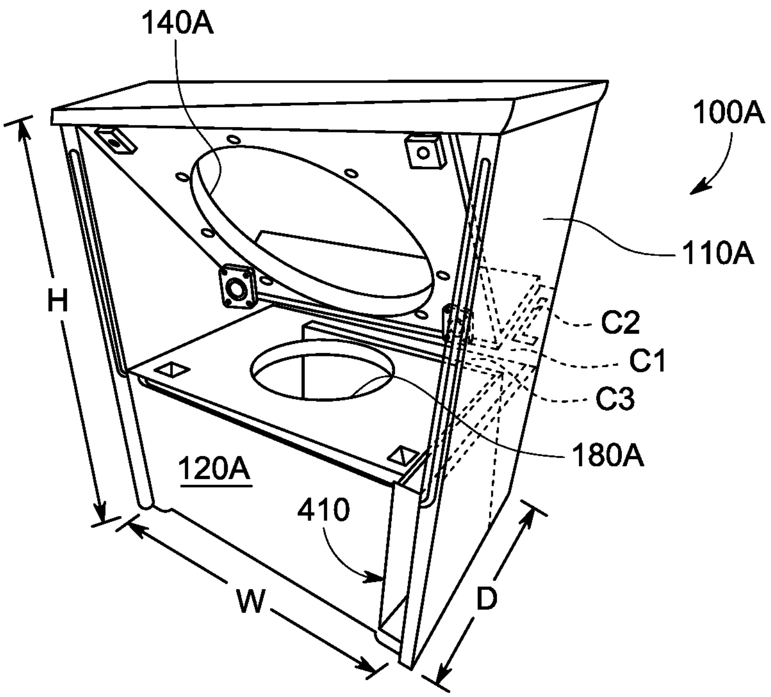
FIG. 7, a perspective view of an embodiment shown in FIGS. 5 and 6, presents physical dimensions of an illustrative example of a loudspeaker enclosure, in accordance with the present subject matter, looking downwardly from the front.

Referring next to FIG. 7, a prototype of the loudspeaker enclosure 100A is shown. The prototype is about 18.25 inches wide (W), about 22 inches high (H), and about 14.25 inches deep (D). Internal structural details, shown in phantom line, include channels communicating with air inlet port 410. One such internal channel (C1), about 2-inches wide, is configured to provide air to both the tweeter speakers 305. Another such internal channel (C2), about 1 and ½-inches wide, is configured to provide air to the mid-range speaker 301. Still another internal channel (C3) is dimensioned and configured to provide an adequate supply of air to sub-woofer speaker 303. One of ordinary skill in the field of the present subject matter is aware of conditions necessitating a variety of loudspeaker enclosures of the present subject matter to have slightly different, or entirely different, physical dimensions.

Mid-range speaker 301 (about 12 inches in diameter) within upper section 110A of loudspeaker enclosure 100A is oriented at a 45 degree angle relative to the sub-woofer speaker 303 (about 8 inches in diameter) within lower section 120A.

Figure 8:
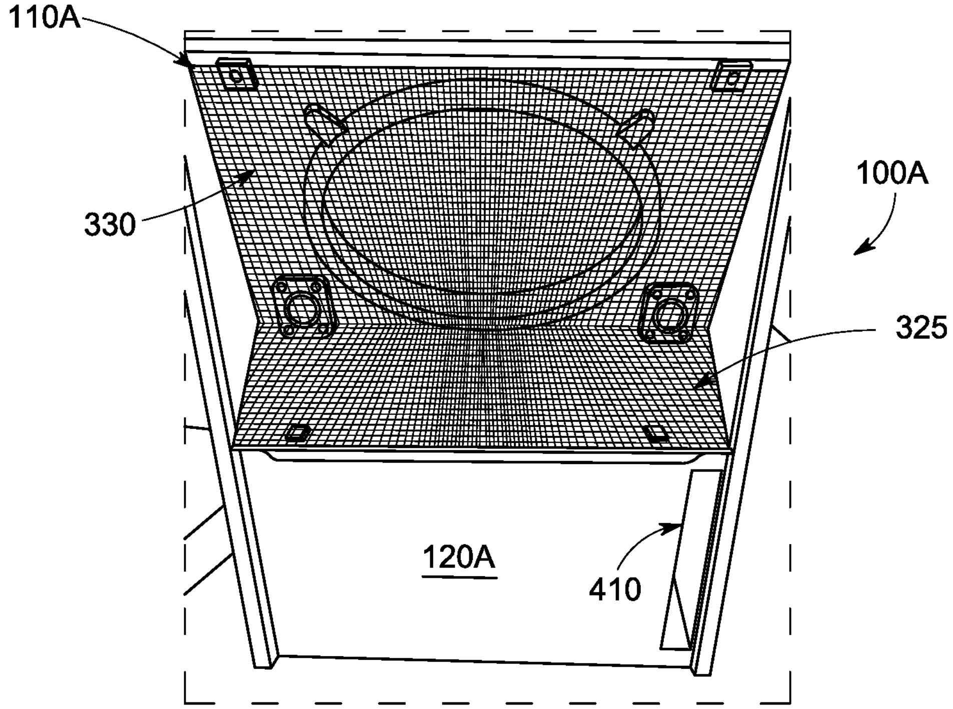
FIG. 8, a front elevational view of the embodiment of the loudspeaker enclosure shown in FIGS. 4-7, shows a component used to protect the speakers.

In FIG. 8 is presented the prototype of the loudspeaker enclosure 100A shown in FIG. 7, showing a lower screen 325 and an upper screen 330, oriented relative to the other, to protect the mid-range speaker 301, the sub-woofer speaker 303, and the pair of tweeter speakers 305 contained within enclosure 100A (FIG. 6).

Summarizing the disclosure presented above, this patent specification and application is principally directed to a design for a loudspeaker enclosure that locates and orients all of the speakers contained within the speaker enclosure in a predetermined spatial arrangement, designed to position each speaker relative to every other speaker within the enclosure, to achieve a constructive interference effect for producing a high-quality sound for an assortment of listening tastes. This patent application is also directed to a loudspeaker system enclosure comprising the loudspeaker enclosure and above-noted speakers contained in the enclosure.

This patent specification and application is also directed to a design for a loudspeaker enclosure that locates and orients the speakers contained within the enclosure in a predetermined arrangement, designed to position each speaker relative to every other speaker in the enclosure, to achieve a mixed constructive and destructive interference effect, to produce a predetermined-quality sound for a variety of listening tastes, and includes the system producing such sound quality.

Additional features of the present subject matter include the following. The loudspeaker enclosure of the present subject matter is mobile. It can be used for indoor and outdoor festivities. It can be equipped in the upper section 110 with a Bluetooth media player which could play music directly from an iPhone, smart phone, or other audio source. "Add-ons" including LED lights, controlled by a smart phone via known applications to produce different color settings synchronized to music being played, could be used. The system could be based, e.g., upon a car audio setup, since the system could be powered by a 12-volt power supply capable of 400 watts of output power. Due to its design, when provided 400 watts to drive the speakers contained, my loudspeaker enclosure easily fills a large ballroom with music with the turn of a dial. The system of my present invention could be a home audio system for everyday use. The system of my present invention could be linked to a projector for indoor/outdoor movie nights. The system of my present invention could be set up for backyard BBQs, or at public parks where such music is allowed.

What has been illustrated and described in this application is a loudspeaker enclosure as well as a novel sound system comprising the loudspeaker enclosure of the present subject matter. While the present subject matter has been described with reference to an exemplary embodiment, the present subject matter is not limited to this example. On the contrary, many alternatives, changes, and/or modifications will become apparent to those of ordinary skill in the field of the present subject matter after this patent specification is read. As a result, all such alternatives, changes, and/or modifications are to be treated as part of the present subject matter insofar as they fall within the spirit and scope of claims that follow.

I claim:

1. A speaker enclosure consisting of a first section and a second section, wherein the first section includes a first surface, wherein the second section includes a second surface, wherein a portion of the first surface is adapted and configured to retain only one mid-range speaker, wherein a portion of the second surface is adapted and configured to retain only one subwoofer speaker, wherein the first surface portion and the second surface portion are arranged to form an acute angle therebetween, wherein one of the first and second sections is adapted and configured to include a spaced-apart pair of tweeter speakers, wherein the tweeter speakers are configured to each receive a signal to produce treble sound waves and high-frequency sound waves, wherein the one mid-range speaker and the one subwoofer speaker are each adapted and configured to receive a signal resulting in the one subwoofer speaker and the one mid-range speaker generating sound waves simultaneously, for thereby producing sound waves characterized as including both compressions and rarefactions.

2. The speaker enclosure of claim 1, wherein the one subwoofer speaker is oriented within the enclosure for generating sound waves directed toward the first surface, and wherein the one mid-range speaker is oriented within the enclosure for generating sound waves directed toward the second surface.

3. The speaker enclosure of claim 1, wherein the first or the second section is further adapted and configured to additionally retain a Bluetooth media player.

4. The speaker enclosure of claim 1, wherein the acute angle ranges from about 5 degrees to about 85 degrees.

5. The speaker enclosure of claim 1, wherein the acute angle ranges from about 15 degrees to about 75 degrees.

6. The speaker enclosure of claim 1, wherein the acute angle ranges from about 25 degrees to about 65 degrees.

7. The speaker enclosure of claim 1, wherein the acute angle ranges from about 35 degrees to about 55 degrees.

8. A speaker enclosure consisting of a first section and a second section, wherein the first section includes a first surface, wherein the second section includes a second surface, wherein a portion of the first surface is adapted and configured to retain only one mid-range speaker, wherein a portion of the second surface is adapted and configured to retain only one subwoofer speaker, wherein the first surface portion and the second surface portion are arranged to form an acute angle therebetween, wherein one of the first and second sections is adapted and configured to include a spaced-apart pair of tweeter speakers, wherein the tweeter speakers are configured to each receive a signal to produce treble sound waves and high-frequency sound waves, wherein the one mid-range speaker and the one subwoofer speaker are each adapted and configured to receive a signal resulting in the one subwoofer speaker and the one mid-range speaker generating sound waves simultaneously, for thereby producing sound waves characterized as including compressions.

9. The speaker enclosure of claim 8, wherein the one subwoofer speaker is oriented within the enclosure for generating sound waves directed toward the first surface, and wherein the one mid-range speaker is oriented within the enclosure for generating sound waves directed toward the second surface.

10. The speaker enclosure of claim 8, wherein the first or the second section is further adapted and configured to additionally retain a Bluetooth media player.

11. The speaker enclosure of claim 8, wherein the acute angle ranges from about 5 degrees to about 85 degrees.

12. The speaker enclosure of claim 8, wherein the acute angle ranges from about 15 degrees to about 75 degrees.

13. The speaker enclosure of claim 8, wherein the acute angle ranges from about 25 degrees to about 65 degrees.

14. The speaker enclosure of claim 8, wherein the acute angle ranges from about 35 degrees to about 55 degrees.

* * * * *